(12) United States Patent
Yamada

(10) Patent No.: US 9,183,633 B2
(45) Date of Patent: Nov. 10, 2015

(54) IMAGE PROCESSING APPARATUS AND IMAGE PROCESSING METHOD

(71) Applicant: Panasonic Corporation, Osaka (JP)

(72) Inventor: Hitoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 14/009,958

(22) PCT Filed: Dec. 12, 2012

(86) PCT No.: PCT/JP2012/007932
§ 371 (c)(1),
(2) Date: Oct. 4, 2013

(87) PCT Pub. No.: WO2013/094154
PCT Pub. Date: Jun. 27, 2013

(65) Prior Publication Data
US 2014/0023292 A1    Jan. 23, 2014

(30) Foreign Application Priority Data
Dec. 21, 2011   (JP) .................. 2011-280172

(51) Int. Cl.
*G06K 9/36* (2006.01)
*G06K 9/00* (2006.01)
*G06T 7/00* (2006.01)
*H04N 5/262* (2006.01)

(52) U.S. Cl.
CPC ............ *G06T 7/004* (2013.01); *G06T 7/0018* (2013.01); *G06T 7/0061* (2013.01); *G06T 7/0085* (2013.01); *H04N 5/2628* (2013.01); *G06T 2207/30244* (2013.01)

(58) Field of Classification Search
CPC .... G06K 9/3208; G06K 9/3275; G06T 7/004; G06T 7/0085; G06T 7/0018; G06T 2207/30244; H04N 5/2628
USPC .................................................. 382/289, 168
See application file for complete search history.

(56) References Cited

U.S. PATENT DOCUMENTS 5,054,098 A * 10/1991  Lee ............................... 382/289
6,532,303 B2 * 3/2003  Saiga ............................ 382/198
(Continued)

FOREIGN PATENT DOCUMENTS

WO    2009/001512    12/2008
WO    2011/155161    12/2011

OTHER PUBLICATIONS

International Search Report issued Feb. 12, 2013 in International Application No. PCT/JP2012/007932.

*Primary Examiner* — Kanjibhai Patel
(74) *Attorney, Agent, or Firm* — Wenderoth, Lind & Ponack, L.L.P.

(57) ABSTRACT

An image processing apparatus is an image processing apparatus which derives an angle of inclination of an image and includes: an edge angle calculation unit which calculates a plurality of edge angles corresponding to a plurality of pixels in the image by calculating, in each of the pixels, an edge angle that is an angle of an edge; a use angle identification unit which identifies one or more use angles that are each the edge angle and are each a candidate for the angle of inclination, using the edge angles and a plurality of depth values that correspond to the pixels and each indicate a depth of a corresponding one of the pixels; and an inclination angle derivation unit which derives the angle of inclination from the one or more use angles.

13 Claims, 10 Drawing Sheets

(56) References Cited

U.S. PATENT DOCUMENTS

| | | | |
|---|---|---|---|
| 8,139,897 B2 * | 3/2012 | Kojima | 382/298 |
| 8,340,432 B2 * | 12/2012 | Mathe et al. | 382/190 |
| 8,466,970 B2 | 6/2013 | Kimura et al. | |
| 8,682,106 B2 * | 3/2014 | Kotake | 382/285 |
| 2010/0177197 A1 | 7/2010 | Kimura et al. | |
| 2012/0105578 A1 | 5/2012 | Ohmiya et al. | |

* cited by examiner

IMAGE PROCESSING APPARATUS AND IMAGE PROCESSING METHOD

TECHNICAL FIELD

The present invention relates to an image processing apparatus which derives an angle of inclination of an image.

BACKGROUND ART

Patent Literature (PTL) 1 discloses technology related to the image processing apparatus which derives an angle of inclination of an image.

CITATION LIST

Patent Literature

[PTL 1] International Publication No. WO2009/001512

SUMMARY OF INVENTION

However, there are cases where the angle of inclination of the image is not properly derived. In this case, it is difficult to correct inclination of the image.

Thus, the present invention provides an image processing apparatus which is capable of properly deriving an angle of inclination of an image.

An image processing apparatus according to an aspect of the present invention is an image processing apparatus which derives an angle of inclination of an image and comprises: an edge angle calculation unit configured to calculate a plurality of edge angles corresponding to a plurality of pixels in the image by calculating, in each of the pixels, an edge angle that is an angle of an edge; a use angle identification unit configured to identify one or more use angles using a plurality of depth values and the edge angles, the one or more use angles each being the edge angle and each being a candidate for the angle of inclination, the depth values corresponding to the pixels and each indicating a depth of a corresponding one of the pixels; and an inclination angle derivation unit configured to derive the angle of inclination from the one or more use angles.

It is to be noted that these generic or specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

The image processing apparatus in the present invention is capable of properly deriving an angle of inclination of an image.

Figure 1:
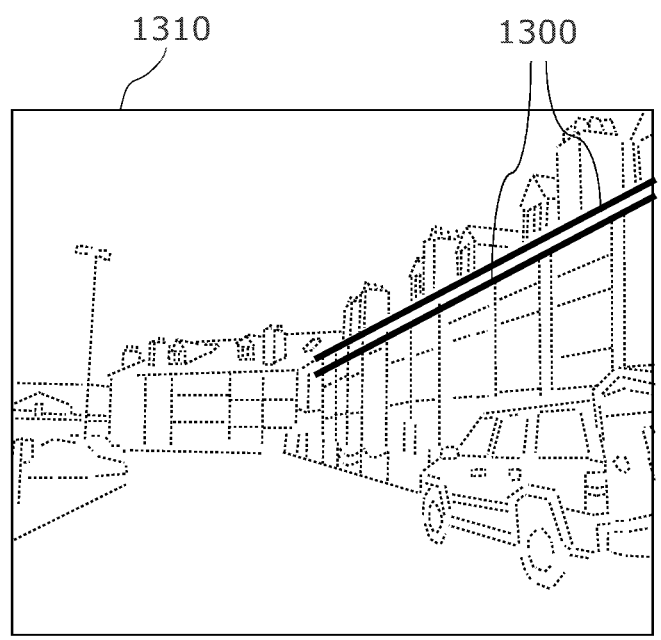
FIG. 1 shows an image which includes line segments in a depth direction.

DETAILED DESCRIPTION (Underlying Knowledge Forming Basis of the Present Invention)

The inventor of the present invention has found problems in the image processing apparatus, stated in the [Background Art] section, which derives an angle of inclination of an image. A specific description is given below.

Resent years have seen reductions in size and weight of imaging apparatuses such as digital still cameras and digital movie cameras. Such imaging apparatuses are portable and likely to be inclined when capturing images. Thus, the captured images will be vertically or horizontally displaced images or inclined images.

Here, the vertically or horizontally displaced images mean that a subject is vertically or horizontally displaced in the image. The inclined image means that a subject is inclined in the image. In other words, the inclined image means that there is a difference between the horizontal or vertical direction of the subject in the image and the horizontal or vertical direction of the image. It is to be noted that the angle of inclination of an image indicates an angle between the horizontal or vertical direction of a subject in the image and the horizontal or vertical direction of the image.

Users find it uncomfortable to view inclined images. Therefore, correcting the inclination of an image by rotating the image is effective in some cases.

Furthermore, there are wearable cameras, which have emerged in recent years, in addition to the pre-existing digital still cameras and digital movie cameras. The wearable cameras are constantly mounted on users' bodies to capture images around the users, for example. This allows constant recording of events which are experienced by the users. Thus, the users are constantly able to check the safety and security.

Meanwhile, a captured image will be an inclined image when a wearable camera is wrongly worn at a slant or when a wearable camera is inclined due to the movement of a user wearing the wearable camera or other causes. Since users find it uncomfortable to view inclined images as mentioned above, correcting the inclination is likewise effective in this case, too.

A known method of correcting inclination of an image is a method of deriving (estimating) an angle of inclination of the image by using information from the image, to correct the inclination (e.g., PTL 1). This method utilizes the fact that line segments which form a structural object captured in an image are likely to be horizontal or vertical with respect to the ground. Accordingly, the angle of a line segment included in an image (the angle between the line segment included in the image and the horizontal or vertical direction of the image) is likely to correspond to the angle of inclination of the image.

Thus, the angle of inclination of the image is estimated from the angle of a line segment in the image. This method is effective especially when there is a structural object captured in the image.

Furthermore, in addition to the information from the image, information from a sensor may be used. This allows a more accurate angle of inclination to be derived. For example, a sensor in an imaging apparatus is capable of obtaining a range of angles of inclination of the imaging apparatus at the time of capturing images. The size of the range is based on the accuracy of the sensor. Within the obtained range, an angle of inclination is derived from the angle of a line segment included in the image, which allows a more accurate angle of inclination to be derived.

For example, an image processing apparatus which derives an angle of inclination of an image first calculates, in each pixel in the image, vertical edge strength and horizontal edge strength using the Sobel Filter. The image processing apparatus then calculates an edge angle in each pixel from the vertical edge strength and horizontal edge strength.

Subsequently, the image processing apparatus generates a histogram which represents the distribution of all edge angles corresponding to all the pixels in the image. The image processing apparatus derives an angle of inclination using an edge angle which has a frequency (the number of observations or the number of pixels) higher than or equal to a threshold value in the histogram.

In the case where the sensor is used, the image processing apparatus narrows the range of edge angles using the information from the sensor. The image processing apparatus then derives, as the angle of inclination, an edge angle which has the highest frequency in the narrowed range.

In this regard, not only the line segments indicating the horizontal or vertical direction, but also a plurality of line segments exists in an image. The angle of inclination is correctly derived when the plurality of line segments indicating the horizontal or vertical direction is dominant in all the line segments included in the image. However, the angle of inclination is not correctly derived when the plurality of line segments not indicating the horizontal or vertical direction is dominant in all the line segments included in the image. A representative example is an image in which the line segments of a structural object are oblique.

FIG. 1 shows an image which includes line segments in a depth direction. The line segment in the depth direction is referred to also as a perspective line. Specifically, in an image 1310 in FIG. 1, a structural object exists over the range from the front side to the back side. Therefore, a line segment 1300 appears obliquely in the image 1310. The oblique line segment 1300 does not indicate the inclination of the imaging apparatus or the inclination of the image 1310. When this oblique line segment 1300 is dominant in the image 1310, then the angle of inclination of the image 1310 is not properly derived.

Even in the case where the sensor is used, there is the same or like problem. In the wearable camera or the like, there are cases where the sensor is not capable of properly detecting the angle of inclination of the wearable camera due to impact caused by walking and so on. This means that an error of the angle of inclination detected by the sensor is large. Therefore, there is difficulty in narrowing the range of angles of inclination of the image using the angle of inclination detected by the sensor. Consequently, there are cases where the range resulting from the narrowing using the sensor includes angles of line segments in the depth direction. In this case, the angle of inclination of the image is not properly derived.

Thus, there are cases where the angle of inclination of an image is not properly derived even in the case where the sensor is used.

In order to solve such problems, an image processing apparatus according to an aspect of the present invention is an image processing apparatus which derives an angle of inclination of an image and comprises: an edge angle calculation unit configured to calculate a plurality of edge angles corresponding to a plurality of pixels in the image by calculating, in each of the pixels, an edge angle that is an angle of an edge; a use angle identification unit configured to identify one or more use angles using a plurality of depth values and the edge angles, the one or more use angles each being the edge angle and each being a candidate for the angle of inclination, the depth values corresponding to the pixels and each indicating a depth of a corresponding one of the pixels; and an inclination angle derivation unit configured to derive the angle of inclination from the one or more use angles.

With this, the image processing apparatus is capable of properly identifying a candidate for the angle of inclination (the use angle) from among a plurality of edge angles corresponding to a plurality of pixels by using a plurality of depth values corresponding to the pixels. Thus, the image processing apparatus is capable of deriving a proper angle of inclination.

For example, the use angle identification unit may identify, as the one or more use angles, one or more edge angles each having a frequency higher than or equal to a predetermined frequency from among the edge angles which correspond to a plurality of the pixels and have a degree of depth variance lower than or equal to a predetermined degree of depth variance, the degree of depth variance indicating a degree of variance of the depth values.

By doing so, the image processing apparatus is capable of identifying, as the candidate for the angle of inclination, an edge angle having a high frequency from among the edge angles which correspond to a plurality of the pixels and each of which has a low degree of depth variance.

Furthermore, for example, the use angle identification unit may include: a histogram generation unit configured to generate a plurality of histograms by generating, for each depth level, a histogram of the edge angles calculated by the edge angle calculation unit, the depth level indicating a degree of the depth values; and a use angle identification processing unit configured to identify, as the one or more use angles, one or more of the edge angles which meets a predetermined condition in the histograms.

With this, the image processing apparatus is capable of identifying a candidate for the angle of inclination using the histograms generated for the respective depth levels.

Furthermore, for example, the use angle identification processing unit may identify, as the one or more use angles, one or more of the edge angles which has a frequency higher than or equal to a predetermined frequency in any of the histograms.

By doing so, the image processing apparatus identifies, as the candidate for the angle of inclination, an edge angle which has a high frequency in one of the depth levels. The edge angle which has a high frequency in one of the depth levels is likely to be different from the angles of line segments in the depth direction. Thus, the image processing apparatus is capable of properly identifying a candidate for the angle of inclination.

Furthermore, for example, the use angle identification processing unit may identify, as the one or more use angles, one or more of the edge angles which has a highest frequency in the histograms.

By doing so, the image processing apparatus identifies, as the candidate for the angle of inclination, an edge angle which has a high frequency in the histograms generated for the respective depth levels. In the case where the histograms are generated for the respective depth levels, the frequency of the edge angle corresponding to the depth direction decreases because of the separation into the multiple histograms. Thus, the image processing apparatus is capable of properly identifying a candidate for the angle of inclination.

Furthermore, for example, the use angle identification processing unit may identify, as the one or more use angles, one or more of the edge angles which has a local maximum frequency in any of the histograms.

By doing so, the image processing apparatus identifies, as the candidate for the angle of inclination, an edge angle which has a local maximum frequency in the histograms generated for the respective depth levels. In the case where the histograms are generated for the respective depth levels, the frequency corresponding to the depth direction decreases and therefore may not become the local maximum value. Thus, the image processing apparatus is capable of properly identifying a candidate for the angle of inclination.

Furthermore, for example, the use angle identification unit may include: a histogram generation unit configured to generate a histogram of the edge angles calculated by the edge angle calculation unit; a candidate use angle identification processing unit configured to identify a plurality of candidate use angles that are a plurality of the edge angles which meet a predetermined condition in the histogram, the candidate use angles being a plurality of candidates for the one or more use angles; and a use angle identification processing unit configured to obtain a plurality of degrees of depth variance corresponding to the candidate use angles by obtaining a degree of depth variance for each of the candidate use angles, and identify the one or more use angles from among the candidate use angles based on the degrees of depth variance, the degree of depth variance indicating a degree of variance of the depth values.

With this, the image processing apparatus is capable of properly identifying a candidate for the angle of inclination based on the degree of depth variance.

Furthermore, for example, the use angle identification processing unit may identify, as the one or more use angles, at least one of the candidate use angles that corresponds to the degree of depth variance which is lower than or equal to a predetermined degree of depth variance.

By doing so, the image processing apparatus is capable of property identifying a candidate for the angle of inclination from among the edge angles which correspond to a plurality of the pixels and each of which has a low degree of depth variance.

Furthermore, for example, the candidate use angle identification processing unit may identify, as the candidate use angles, a plurality of the edge angles each having a frequency higher than or equal to a predetermined frequency in the histogram.

By doing so, the image processing apparatus is capable of properly identifying a candidate for the angle of inclination using an edge angle which has a high frequency.

Furthermore, for example, the image processing apparatus may further include an inclination correction unit configured to correct inclination of the image using the angle of inclination derived by the inclination angle derivation unit.

With this, the image processing apparatus is capable of properly correcting inclination of the image using a proper angle of inclination.

Furthermore, for example, the inclination angle derivation unit may be configured to derive, as the angle of inclination, (i) a mean value of the one or more use angles or (ii) any of the one or more use angles.

By doing so, even in the case where there is a plurality of candidates for the angle of inclination, the image processing apparatus is capable of deriving an angle of inclination from the candidates.

It is to be noted that these generic or specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, or recording media.

The following specifically describes embodiments with reference to the drawings. It is to be noted that each of the embodiments described below shows a general or specific example. The numeral values, shapes, materials, structural elements, the arrangement and connection of the structural elements, steps, the processing order of the steps, etc. shown in the following embodiments are mere examples, and therefore do not limit the present invention. Therefore, among the structural elements in the following embodiments, structural elements not recited in any one of the independent claims defining the broadest concept are described as arbitrary structural elements.

(Embodiment 1)

Figure 2:
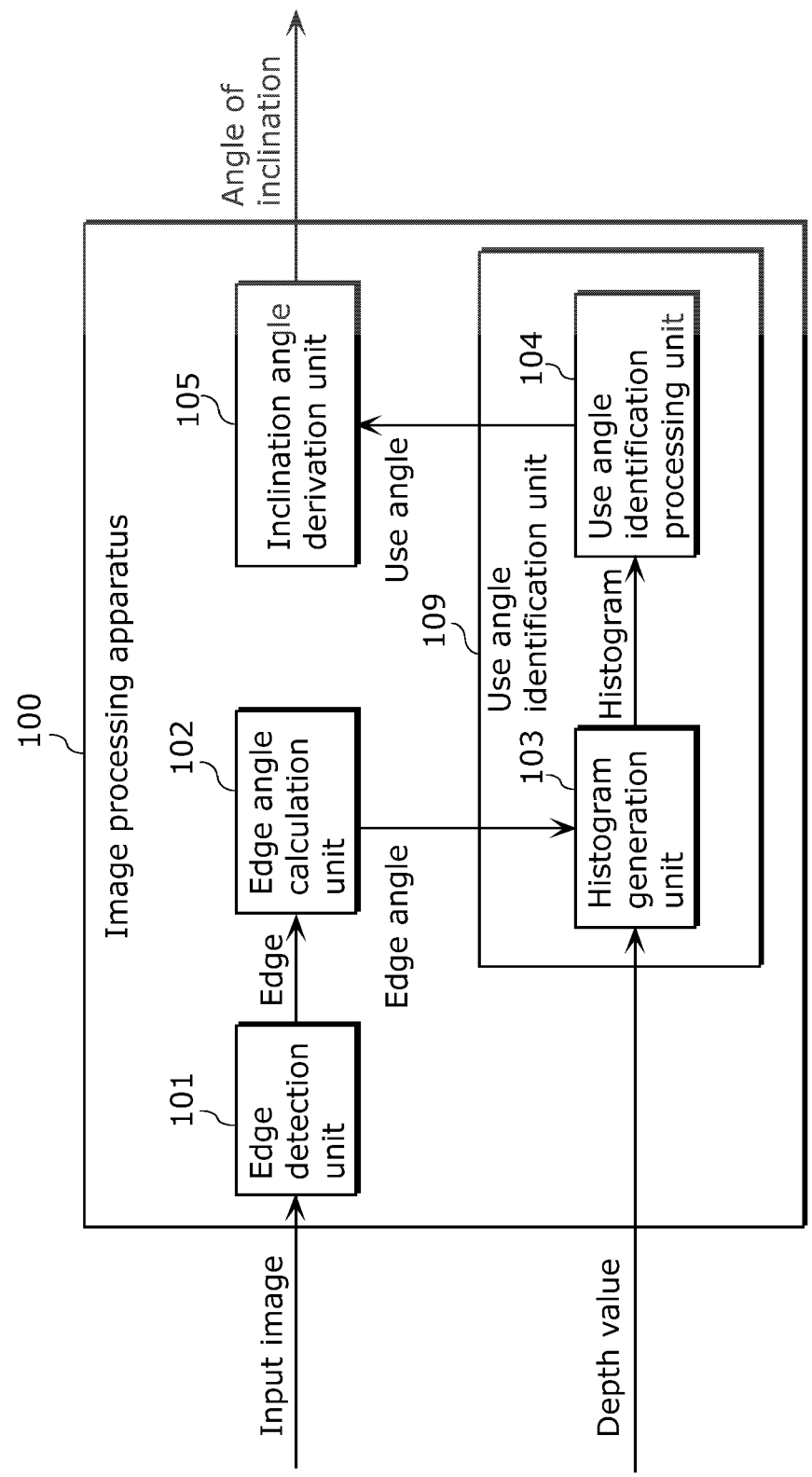
FIG. 2 is a diagram showing a structure of an image processing apparatus according to Embodiment 1.

FIG. 2 shows a structure of an image processing apparatus 100 according to this embodiment.

The image processing apparatus 100 includes an edge detection unit 101, an edge angle calculation unit 102, a use angle identification unit 109, and an inclination angle derivation unit 105. The use angle identification unit 109 includes a histogram generation unit 103 and a use angle identification processing unit 104.

Figure 3:
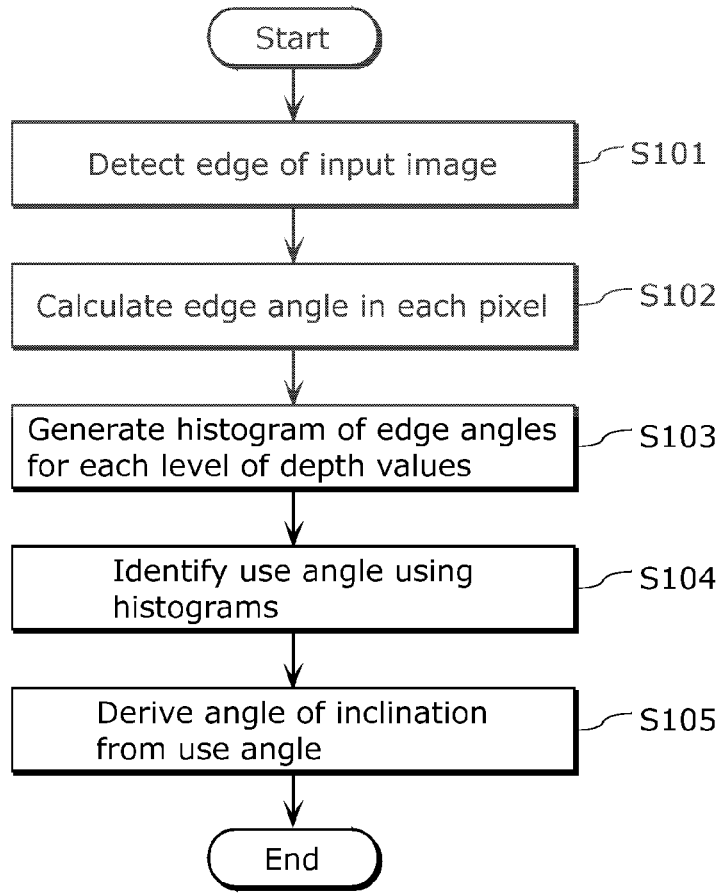
FIG. 3 is a flowchart showing an operation of the image processing apparatus according to Embodiment 1.

FIG. 3 shows a procedure for the image processing apparatus 100 to derive an angle of inclination. A flow of the derivation of an angle of inclination is described below with reference to FIGS. 2 and 3.

First, the edge detection unit 101 detects an edge in an input image (S101). The edge detection unit 101 inputs information on the edge to the edge angle calculation unit 102. Next, from the information on the edge, the edge angle calculation unit 102 calculates, in each pixel, an edge angle that is an angle of the edge (S102).

Next, information on the edge angle calculated in each pixel by the edge angle calculation unit 102 and information on a depth value in each pixel (depth information) are input to the histogram generation unit 103. The histogram generation unit 103 generates a plurality of histograms by generating a histogram of edge angles for each depth level (S103).

The depth level is the level of a depth value and corresponds to the magnitude of the depth value. The level may be replaced by expressions such as a degree, an extent, a category, a class, or a range. The depth values are categorized into plural depth levels by depth resolution that is resolution of the depth value. The depth level may be the same as the depth value. For example, in the case where the depth value is limited to one of 0, 1, 2, and 3 only, the depth level may be treated as the same as the depth value.

Next, the histogram generation unit 103 inputs the histograms for the respective depth levels to the use angle identification processing unit 104. The use angle identification processing unit 104 identifies a use angle (a use edge angle) for each of the histograms (S104). The use angle is an edge angle used as a candidate for the angle of inclination.

For example, the use angle identification processing unit 104 identifies, as the use angle, an edge angle for which, in any of the histograms, the number of pixels corresponding to the number of observations (the frequency) in the histogram is higher than or equal to a threshold value. The use angle identification processing unit 104 may identify, as the use angle, an edge angle at the peak in any one of the histograms. The use angle identification processing unit 104 may identify the use angle based on a combination of these factors.

Next, the use angle identification processing unit 104 inputs information on the use angle to the inclination angle derivation unit 105. The inclination angle derivation unit 105 derives an angle of inclination from the use angle (S105).

Each structural element in the image processing apparatus 100 and the procedure for deriving an angle of inclination are described below in more detail with reference to FIGS. 2 to 7D.

Firstly, an image generated as a result of capturing a subject with an imaging apparatus or the like is input to the edge detection unit 101. This input image may be a raw image generated as a result of the capturing or may also be a converted image such as a gray-scaled image resulting from color system conversion.

Subsequently, the edge detection unit 101 detects an edge in the input image (S101). Specifically, the edge detection unit 101 calculates, in each pixel in the input image, vertical edge strength of the input image and horizontal edge strength of the input image using the Sobel Filter, for example. The vertical edge strength in a pixel is proportional to a difference between the value of the pixel and the value of an upper or lower pixel thereof. The horizontal edge strength in a pixel is proportional to a difference between the value of the pixel and the value of an upper or lower pixel thereof.

Figure 4A:
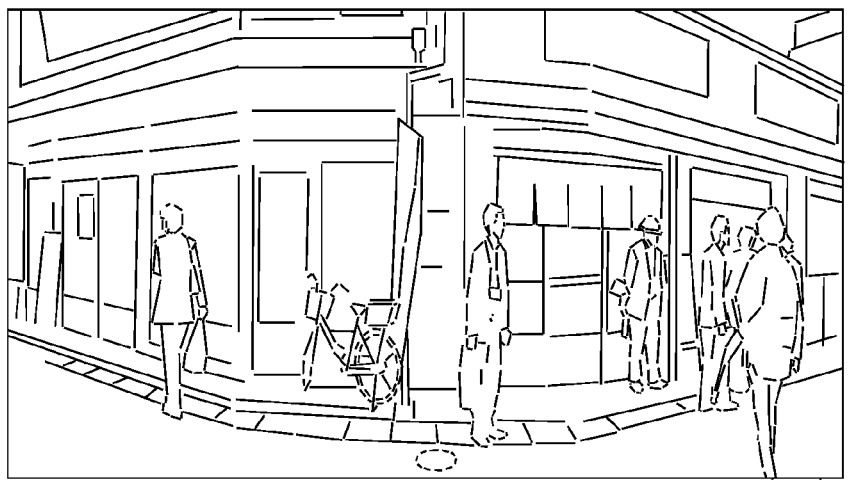
FIG. 4A shows an input image according to Embodiment 1.

FIG. 4A shows the input image according to this embodiment. In FIG. 4A, the input image, i.e., an image 300, is shown.

Figure 4B:
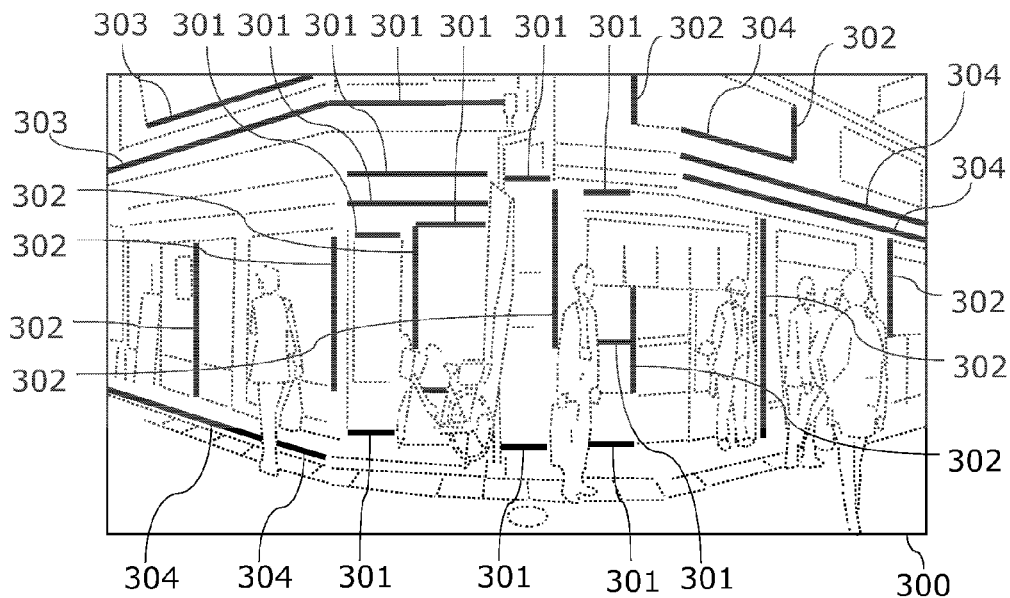
FIG. 4B shows edges according to Embodiment 1.

FIG. 4B shows edges according to this embodiment. In FIG. 4B, the image 300 is displayed with overlying representative edges 301 to 304 obtained by performing the edge detection on the image 300.

The edge 301 corresponds to a horizontal line segment and is made up of pixels having the edge angle to be used for the derivation of an angle of inclination. The edge 302 corresponds to a vertical line segment and is made up of pixels having the edge angle to be used for the derivation of an angle of inclination. The edge 303 and the edge 304 are each made up of pixels having an edge angle not to be used for the derivation of an angle of inclination.

The edge 303 and the edge 304 are each an edge corresponding to a line segment called a perspective line and each correspond to the depth direction of a structural object as mentioned above.

Figure 5:
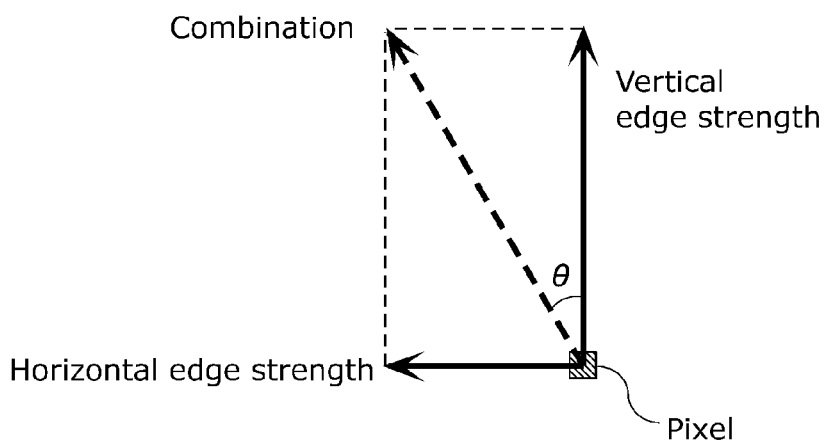
FIG. 5 shows edge strength and an edge angle according to Embodiment 1.

Subsequently, the edge angle calculation unit 102 calculates an edge angle in each pixel from the edge detected by the edge detection unit 101 (S102). In FIG. 5, an edge angle θ corresponding to a pixel is shown. The edge detected by the edge detection unit 101 has vertical edge strength and horizontal edge strength in each pixel. The edge angle calculation unit 102 is capable of calculating the edge angle θ in each pixel by combining the vertical edge strength and the horizontal edge strength.

Here, the edge direction resulting from the combination corresponds to the normal direction of the line segment appearing in the image. Furthermore, the edge angle θ is an angle between the vertical direction of the image and the edge direction. It is to be noted that this definition is an example; the edge direction may be a direction along the line segment appearing in the image, and the edge angle θ may be an angle between the horizontal direction of the image and the edge direction.

The edge angle calculation unit 102 is not required to calculate the edge angle θ in every pixel; it may be that only when the vertical or horizontal edge strength corresponding to a pixel is greater than a predetermined threshold value, does the edge angle calculation unit 102 calculate the edge angle θ corresponding to the pixel. The reason for this is as follows.

An edge indicating a structural object corresponds to the horizontal direction or the vertical direction and therefore is suitable for use in deriving an angle of inclination. On the other hand, an edge indicating the background such as the sky or a region of low texture does not correspond to the horizontal direction or the vertical direction and therefore is not suitable for use in deriving an angle of inclination. In other words, the edge indicating the background or the region of low texture is noise in deriving an angle of inclination. Therefore, the image processing apparatus 100 needs to remove as much information on unnecessary edges, i.e., noise, as possible before deriving an angle of inclination. In order to remove this noise, the edge strength is useful.

As to the edge indicating a structural object, at least one of the vertical edge strength and the horizontal edge strength is high because at least one of vertical contrast and horizontal contrast is high. On the other hand, as to the edge indicating the background or the region of low texture, the vertical edge strength and the horizontal edge strength are low because the vertical contrast and the horizontal contrast are low. Therefore, when the edge strength corresponding to a pixel is low, the edge angle calculation unit 102 does not need to calculate the edge angle corresponding to the pixel.

Subsequently, the histogram generation unit 103 generates, for each preset depth level, a histogram indicating the relationship between the edge angle and the number of pixels, based on the edge angle calculated in each pixel by the edge angle calculation unit 102 and the per-pixel depth value (S103).

Figure 6:
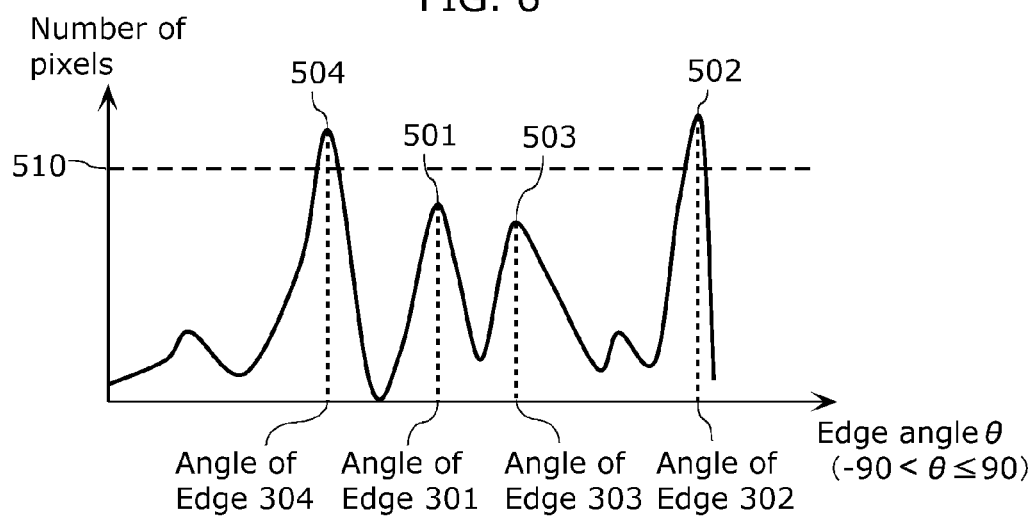
FIG. 6 is a histogram of all edge angles corresponding to all pixels according to Embodiment 1.

An ordinary image processing apparatus generates a histogram representing a distribution of all the edge angles which correspond to all the pixels, and derives an angle of inclination using an edge angle which has a frequency higher than or equal to a threshold value in this histogram. The histogram shown in FIG. 6 is a histogram generated based the image 300 by the ordinary image processing apparatus and represents statistics of all the edge angles which correspond to all the pixels in the image 300. The number of observations represented by the vertical axis of the histogram is the number of pixels, and the class represented by the horizontal axis of the histogram is the edge angle.

In the histogram, there are a peak 501 corresponding to the angle of the edge 301, a peak 502 corresponding to the angle of the edge 302, a peak 503 corresponding to the angle of the edge 303, and a peak 504 corresponding to the angle of the edge 304.

To derive an angle of inclination, an ordinary image processing apparatus uses the edge angles which have the number of pixels no less than a threshold value 510 shown in the histogram, that is, which correspond to the peak 502 and the peak 504. As mentioned above, the edge angle corresponding to the peak 504 is an angle of the edge 304 corresponding to a perspective line. Therefore, the edge angle corresponding to the peak 504 should not be used in deriving an angle of inclination.

Thus, the histogram generation unit 103 in the image processing apparatus 100 according to this embodiment generates histograms based on depth values.

The depth values are specifically values each indicating the depth corresponding to a pixel and each indicate a distance from an imaging position to a subject corresponding to the pixel. For example, the depth values are expressed as values of 0 to 255. The smaller the depth value is, the longer the distance from the imaging position to the subject is; the larger the depth value is, the shorter the distance from the imaging position to the subject is. In other words, when the depth value is 0, the distance from the imaging position to the subject is longest, and when the depth value is 255, the distance from the imaging position to the subject is shortest.

It is to be noted that the above properties of the depth values are an example. The depth values may be expressed as values other than 0 to 255. It may also be that the smaller the depth value is, the shorter the distance from the imaging position to the subject is; the larger the depth value is, the longer the distance from the imaging position to the subject is.

As a method of obtaining the depth values, there are an active distance-measuring method such as the time of flight (TOF) and a passive distance-measuring method such as the depth from focus (DFF) using contrast in a plurality of images. On the method of obtaining the depth values, no limitation is imposed so that various methods are applicable.

Figure 7A:
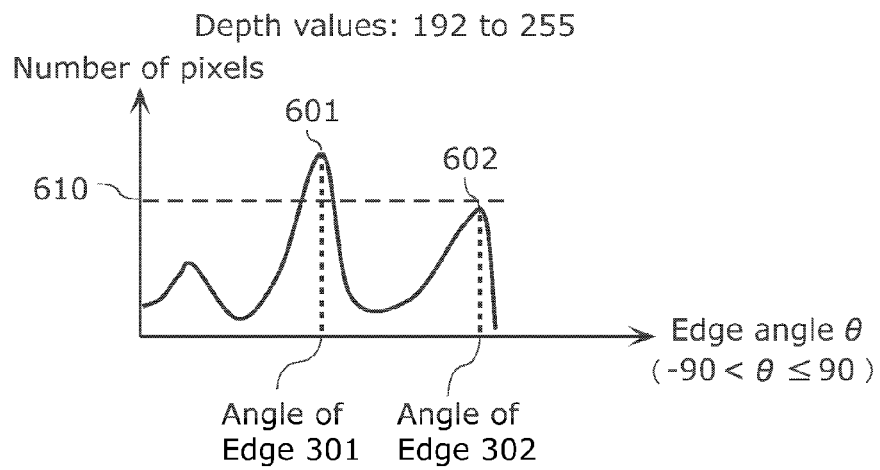
FIG. 7A is a histogram of a plurality of the edge angles in a first depth level according to Embodiment 1.

FIGS. 7A to 7D show the histograms generated for the respective four depth levels into which the depth vales 0 to 255 are categorized. FIG. 7A shows a histogram of plural edge angles which correspond to plural pixels having depth values of 192 to 255 in the image 300. Likewise, FIG. 7B corresponds to depth values of 128 to 191, FIG. 7C corresponds to depth values of 64 to 127, and FIG. 7D corresponds to depth values of 0 to 63.

In the histograms of FIGS. 7A to 7D, the bin width (the class interval) on the horizontal axis is 1 degree. Usually, 1 degree is enough for the bin width. However, depending on the amount of noise in the image, the edge angle obtained by the edge angle calculation unit 102 contains an error. Therefore, the histogram generation unit 103 may generate a histogram with a large bin width such as 2 to 8 degrees.

Generating the histogram with a large bin width will result in the derived angle of inclination being a rough value. The image processing apparatus 100 may use an approximate curve of the histogram in order to derive an angle of inclination with high accuracy. An edge angle corresponding to the peak of the approximate curve is usable as a candidate for deriving an angle of inclination with high accuracy.

Alternatively, in order to derive an angle of inclination with high accuracy, it may be that the image processing apparatus 100 derives a rough angle of inclination first by using a histogram with a large bin width and then generates another histogram with a small bin width within a range indicated by the derived rough angle of inclination. This allows the image processing apparatus 100 to derive an angle of inclination with high accuracy.

The use angle identification processing unit 104 identifies, as the use angle, an edge angle which has the number of pixels higher than or equal to a threshold value, in each of the histograms generated by the histogram generation unit 103 (S104).

The histograms of FIGS. 7A to 7D show a peak 601 corresponding to the angle of the edge 301, a peak 602 corresponding to the angle of the edge 302, a peak 603 corresponding to the angle of the edge 303, and a peak 604 corresponding to the angle of the edge 304. Furthermore, in each of the histograms of FIGS. 7A to 7D, there is a threshold value 610.

Figure 7B:
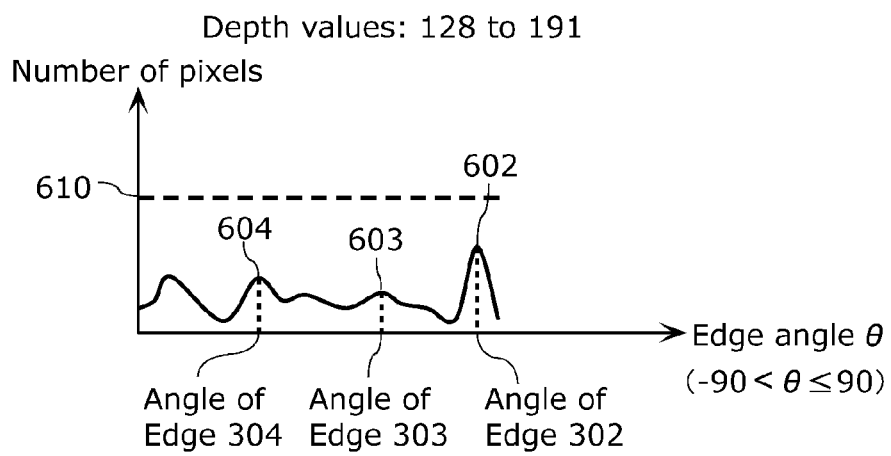
FIG. 7B is a histogram of a plurality of the edge angles in a second depth level according to Embodiment 1.
Figure 7C:
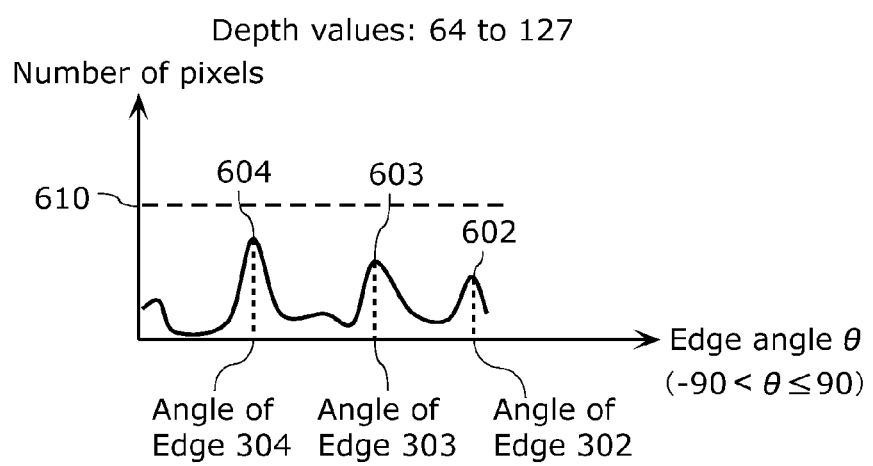
FIG. 7C is a histogram of a plurality of the edge angles in a third depth level according to Embodiment 1.
Figure 7D:
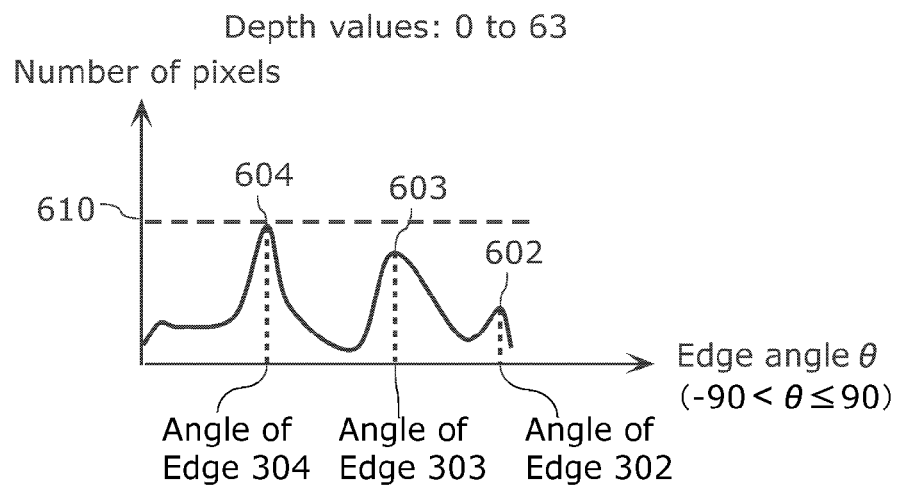
FIG. 7D is a histogram of a plurality of the edge angles in a fourth depth level according to Embodiment 1.

In the histogram of FIG. 7A, the peak 601 exceeds the threshold value 610. Therefore, the edge angle corresponding to the peak 601 is identified as the use angle suited to the derivation of an angle of inclination. In the histograms of FIGS. 7B to 7D, no peaks exceed the threshold value 610. Therefore, the use angle is not identified from the histograms of FIGS. 7B to 7D. By doing so, the edge angle to be used for the derivation of an angle of inclination is identified as the use angle.

The above-described procedure is based on the fact that the depth values (depths) of an edge to be used for the derivation of an angle of inclination are substantially the same. Conversely, the depth values of an edge not to be used for the derivation of an angle of inclination, such as a perspective line, are not the same because the edge appears along the depth direction. This feature is explained with reference to FIG. 8.

Figure 8:
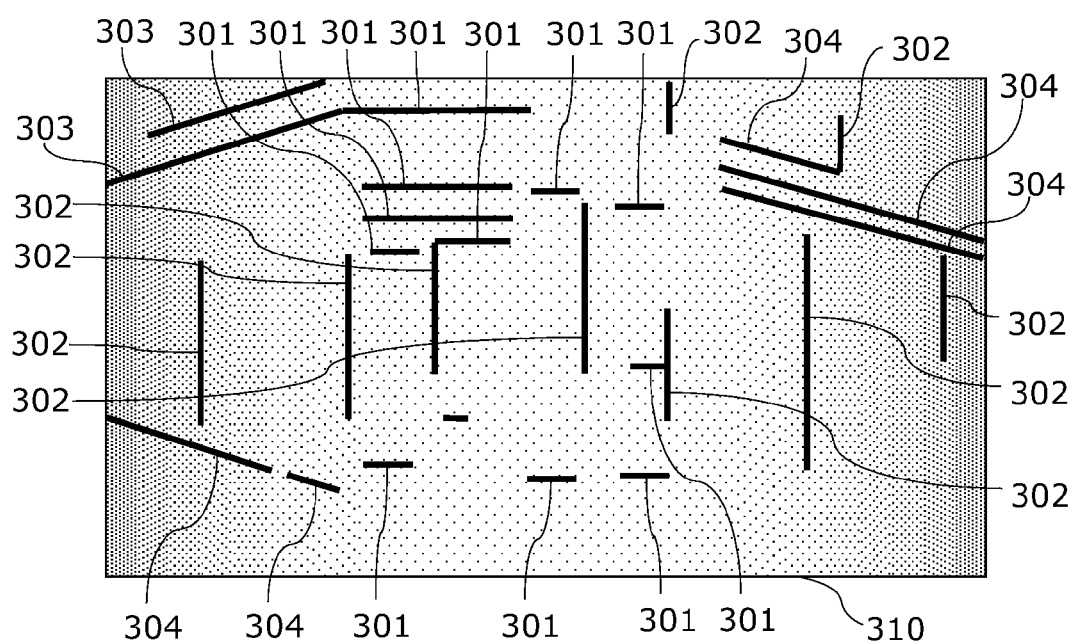
FIG. 8 shows a depth map and edges according to Embodiment 1.

FIG. 8 shows the depth map of the image 300 with the edges 301 to 304 superimposed thereon. The depth map is data showing the depth value in each pixel and is visually represented as an image. In a depth map 310 in FIG. 8, thinner hatching denotes a shorter distance from the imaging position to the subject, and thicker hatching denotes a longer distance from the imaging position to the subject.

The edge 301 to be used for the derivation of an angle of inclination appears only in the area where the hatching is thin in the depth map 310. Meanwhile, the edge 303 not to be used for the derivation of an angle of inclination appears over a thin hatched area to a thick hatched area in the depth map 310.

Thus, in the case where the histograms are generated for the respective depth levels as shown in FIGS. 7A to 7D, the frequency of an edge angle to be used for the derivation of an angle of inclination is concentrated and appears high in one of the histograms, and the frequency of an edge angle not to be used for the derivation of an angle of inclination appears in a plurality of the histograms. Using this feature, the use angle identification processing unit 104 is capable of identifying, as the use angle, not the edge angle not to be used for the derivation of an angle of inclination, but the edge angle to be used for the derivation of an angle of inclination.

It is to be noted that the edge angle having the number of pixels higher than or equal to the threshold value in two or more of the histograms is likely to be an edge angle which corresponds to a line segment in the depth direction. Accordingly, the use angle identification processing unit 104 may identify, as the use angle, an edge angle which has the number of pixels higher than or equal to the threshold value in only one of the histograms.

The inclination angle derivation unit 105 then derives an angle of inclination from the identified one or more use angles (S105).

The inclination angle derivation unit 105 may directly derive the identified use angle as the angle of inclination or may alternatively derive the mean of plural use angles as the angle of inclination. The inclination angle derivation unit 105 may derive, as the angle of inclination, an angle which is closest to the horizontal or vertical direction of the image among the plural use angles. Furthermore, in the case where a sensor is used, the inclination angle derivation unit 105 may derive, as the angle of inclination, a use angle within a range designated based on information on the sensor, from among the plural use angles.

In the case where the input image is video, it may be that the inclination angle derivation unit 105 holds an angle of inclination derived one frame before in the time series and derives, as the angle of inclination of a current frame, a use angle which is closest to the angle of inclination derived one frame before, from among the plural use angles identified in the current frame.

As above, the image processing apparatus 100 according to this embodiment creates the histograms of edge angles for the respective depth levels based on the depth values. Therefore, even when the image includes a large number of line segments in the depth direction, such as perspective lines, the image processing apparatus 100 is capable of identifying the edge angle to be used for the derivation of an angle of inclination. Thus, the image processing apparatus 100 is capable of properly deriving an angle of inclination of the image.

It is to be noted that not only the above method using the Sobel Filter, but also various methods using vertical and horizontal contrast can be applied to the edge detection.

Furthermore, the depth values and the depth levels are not limited to the above examples. As the depth resolution is increased, a larger number of histograms are generated. Desirably, the depth resolution is approximately 4 to 16.

Furthermore, the use angle identification processing unit 104 according to this embodiment identifies, as the use angle to be used for the derivation of an angle of inclination, an edge angle which corresponds to the peak 601. In this regard, various other methods can be applied to the identification of a use angle. For example, the use angle identification processing unit 104 may identify, as the use angle, all the edge angles which each have a frequency higher than the threshold value 610, or may alternatively derive, as the use angle, an edge angle which corresponds to the local maximum value (the peak) in the histogram.

Furthermore, the use angle identification processing unit 104 may identify, as the use angle, only the edge angle which has a frequency higher than a preset threshold value, from among the plural edge angles which correspond to the local maximum value. Specifically, in the histogram of FIG. 7A, the edge angle corresponding to the highest peak 601 may be identified as the use angle, or alternatively, from among the plural edge angles which are close to the edge angle corresponding to the highest peak 601, all the edge angles which exceed the threshold value 610 may each be identified as the use angle.

Figure 9:
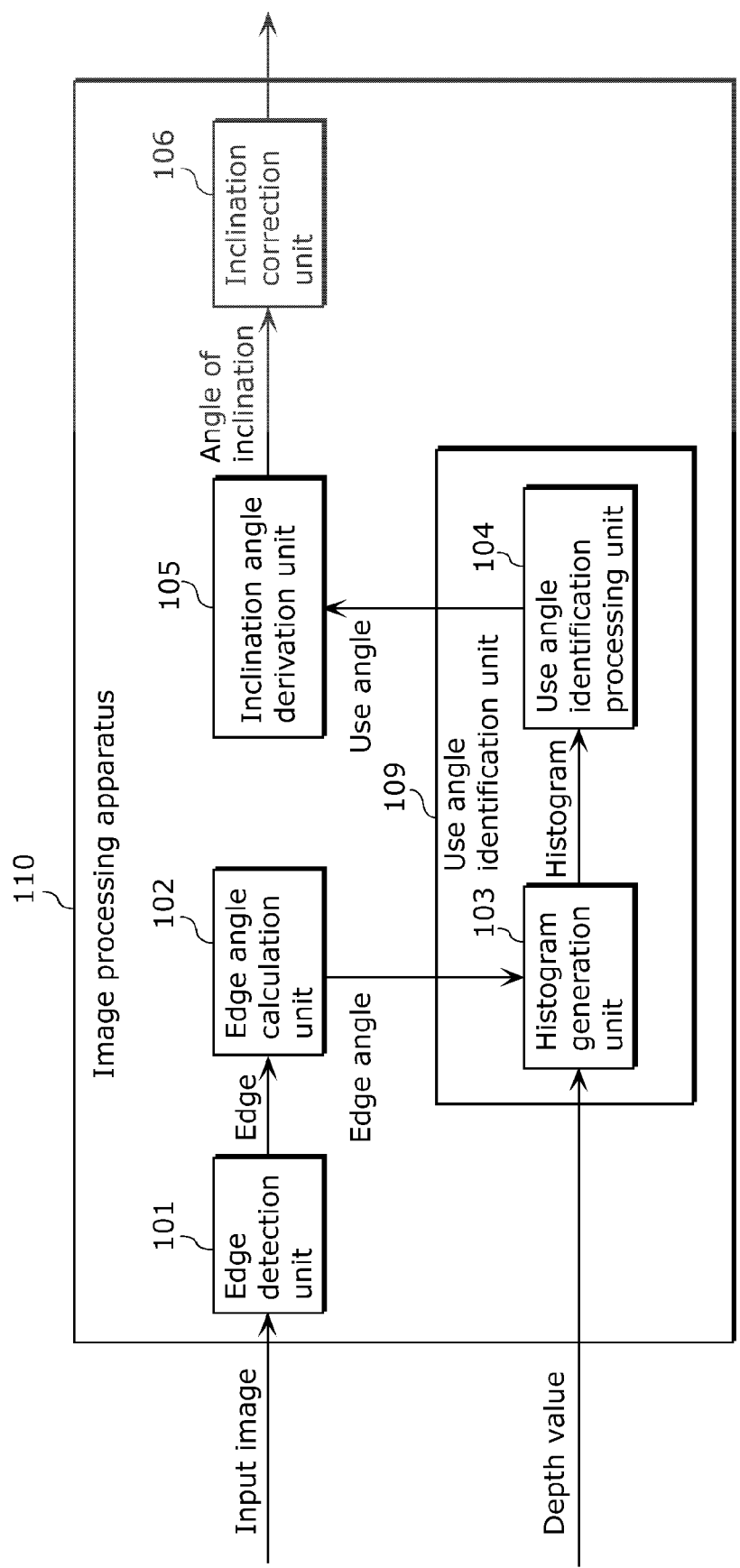
FIG. 9 is a diagram showing a structure of an image processing apparatus according to Variation of Embodiment 1.

Furthermore, as in an image processing apparatus 110 shown in FIG. 9, an inclination correction unit 106 may be included in the structure. The inclination correction unit 106 corrects inclination of the input image based on the angle of inclination derived by the inclination angle derivation unit 105. For example, the affine transformation or the like method may be used for the inclination correction. As the inclination correction, other various methods can be adopted without limitation.

Furthermore, an imaging unit which generates an image by capturing a subject may be added as a structural element. Moreover, a sensor which detects an angle of inclination may be added as a structural element. In addition, a depth map generation unit which generates a depth map may be added as a structural element.

(Embodiment 2)

Figure 10:
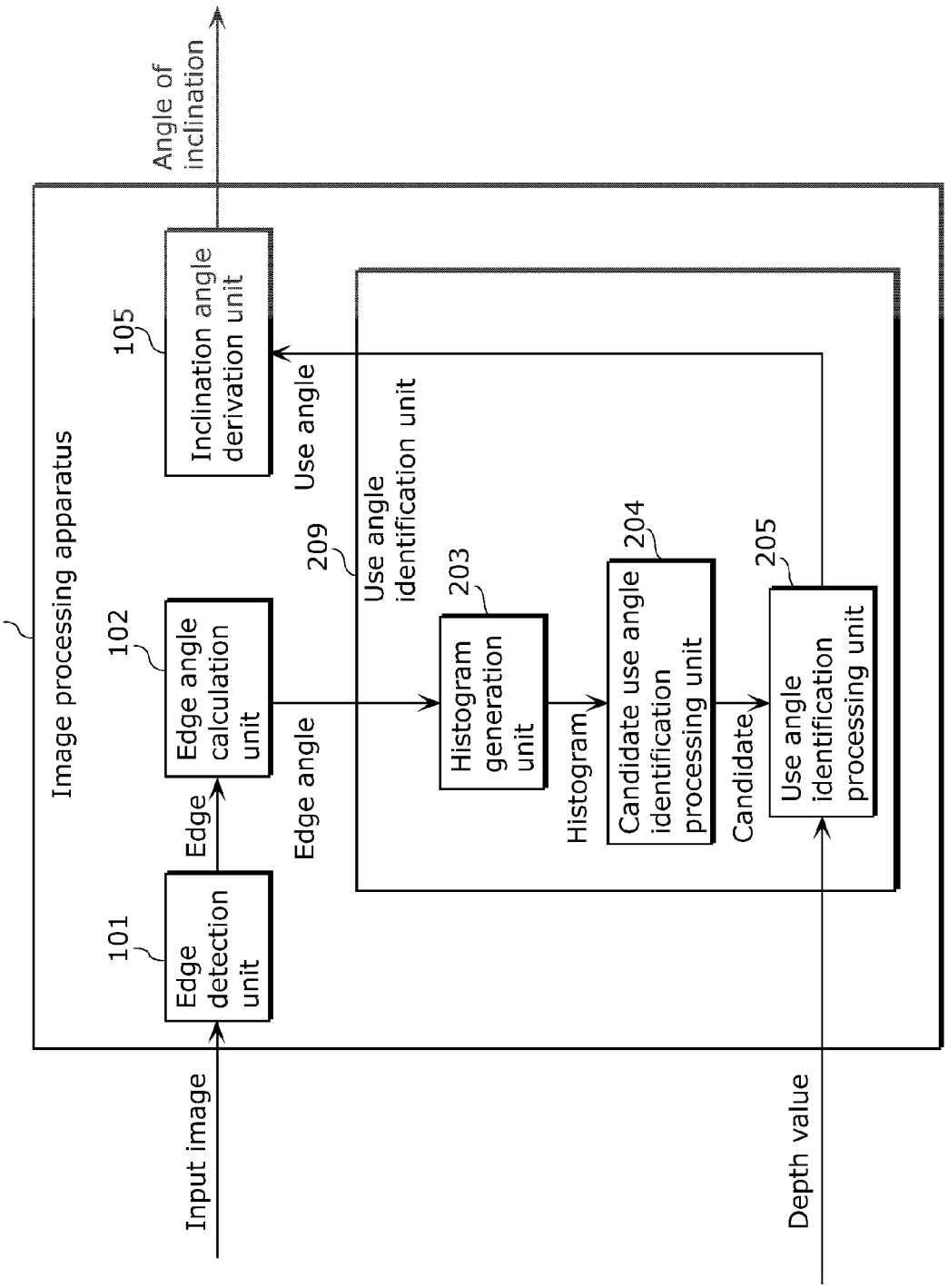
FIG. 10 is a diagram showing a structure of an image processing apparatus according to Embodiment 2.

FIG. 10 shows a structure of an image processing apparatus according to this embodiment. In this embodiment, the structures corresponding to those in Embodiment 1 are denoted by the same numerals.

An image processing apparatus 200 shown in FIG. 10 includes the edge detection unit 101, the edge angle calculation unit 102, a use angle identification unit 209, and the inclination angle derivation unit 105. The use angle identification unit 209 includes a histogram generation unit 203, a candidate use angle identification processing unit 204, and a use angle identification processing unit 205.

Figure 11:
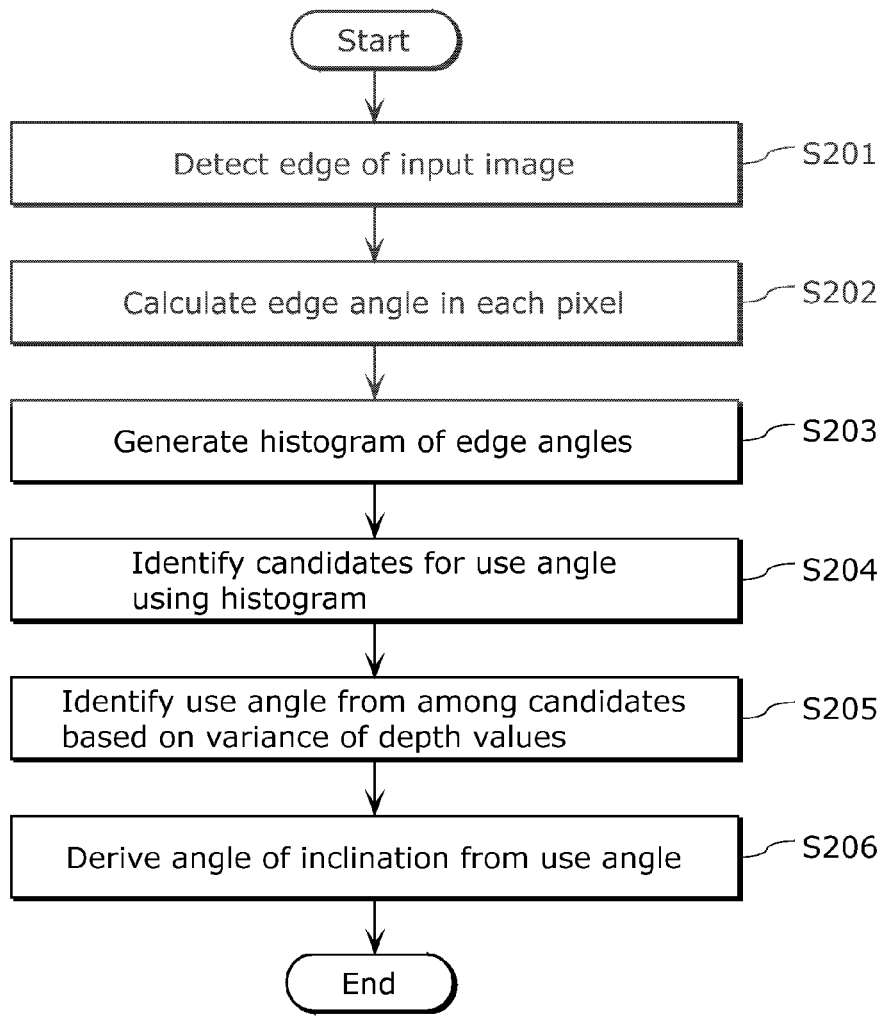
FIG. 11 is a flowchart showing an operation of the image processing apparatus according to Embodiment 2.

FIG. 11 shows a procedure for the image processing apparatus 200 to derive an angle of inclination. A flow of the derivation of an angle of inclination is described below with reference to FIGS. 10 and 11.

First, the edge detection unit 101 detects an edge in an input image (S201). The edge detection unit 101 then inputs information on the edge to the edge angle calculation unit 102. Next, the edge angle calculation unit 102 calculates an edge angle in each pixel based on the edge (S202). The edge angle calculation unit 102 then inputs information on the calculated edge angle to the histogram generation unit 203.

Next, the histogram generation unit 203 generates a histogram of all the edge angles which correspond to all the pixels in the image (S203). The histogram generation unit 203 inputs the histogram to the candidate use angle identification processing unit 204. Next, the candidate use angle identification processing unit 204 identifies, from the generated histogram, a plurality of candidate use angles which each have the number of pixels higher than or equal to a threshold value (S204). The candidate use angle identification processing unit 204 then inputs the candidate use angles to the use angle identification processing unit 205.

Next, the use angle identification processing unit 205 calculates a depth variance value for each of the identified candidate use angles. The depth variance value is a value of variance of plural depth values of plural pixels which correspond to each of the candidate use angles. The use angle identification processing unit 205 identifies, as the use angle, a candidate use angle which has a depth variance value lower than or equal to a threshold value (S205). The use angle identification processing unit 205 then inputs the identified use angle to the inclination angle derivation unit 105. At the end, the inclination angle derivation unit 105 derives an angle of inclination from the identified use angle (S206).

Each structural element in the image processing apparatus 200 and the procedure for deriving an angle of inclination are described below in more detail with reference to FIGS. 10 to 13.

Firstly, the image processing apparatus 200 detects edges (S201) and calculates edge angles (S202). The procedures for detecting edges (S201) and calculating edge angles (S202) are the same as those in Embodiment 1, and descriptions thereof are therefore omitted.

Next, using the edge angles calculated by the edge angle calculation unit 102, the histogram generation unit 203 generates a histogram of all the edge angles which correspond to all the pixels in the image (S203).

Figure 12:
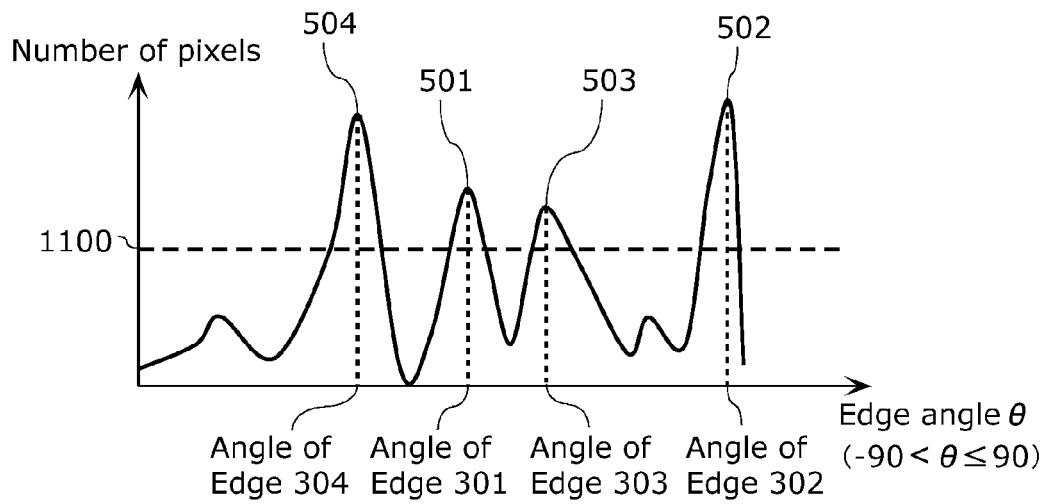
FIG. 12 is a histogram of all edge angles corresponding to all pixels according to Embodiment 2.

FIG. 12 shows the histogram generated by the histogram generation unit 203 based on the image 300 shown in FIG. 4A. Specifically, the histogram that is the same or alike as the histogram shown in FIG. 6 is generated. In the histogram of FIG. 12, there are also the peak 501 corresponding to the angle of the edge 301, the peak 502 corresponding to the angle of the edge 302, the peak 503 corresponding to the angle of the edge 303, and the peak 504 corresponding to the angle of the edge 304.

Subsequently, the candidate use angle identification processing unit 204 identifies a plurality of candidate use angles from the histogram generated by the histogram generation unit 203 (S204). For example, each of the candidate use angles is an edge angle which has a frequency higher than a threshold value 1100 and corresponds to the local maximum value. Specifically, four edge angles which correspond to the peaks 501, 502, 503, and 504 are identified as the candidate use angles.

Here, the threshold value 1100 may be preset or may alternatively be changed as appropriate according to the number of pixels at the peak. For example, in the case where the number of candidate use angles is predetermined to be 4, the threshold value 1100 is set to the value of the peak 503 that is the fourth highest local maximum value.

Subsequently, the use angle identification processing unit 205 calculates a depth variance value of each of the identified candidate use angles, and identifies, as the use angle, a candidate use angle which has a depth variance value lower than or equal to a threshold value (S205). The depth variance value is a value indicating variance of all the depth values of the respective pixels which all correspond to the same edge angle. In other words, a higher depth variance value indicates that the depth values in the plural pixels which correspond to the same edge angle are varied to greater extent. For example, the depth variance value is calculated by a method of calculating a variance value (variance) in the general statistics.

Figure 13:
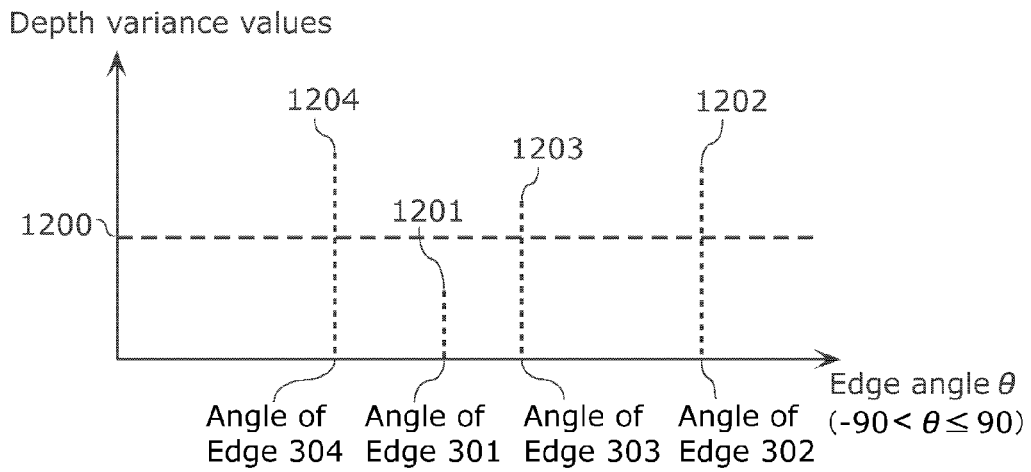
FIG. 13 shows depth variance values according to Embodiment 2.

FIG. 13 is a graph showing the depth variance value calculated for each of the identified candidate use angles. A depth variance value 1201 indicates a depth variance value which corresponds to the candidate use angle based on the peak 501. A depth variance value 1202 indicates a depth variance value which corresponds to the candidate use angle based on the peak 502. A depth variance value 1203 indicates a depth variance value which corresponds to the candidate use angle based on the peak 503. A depth variance value 1204 indicates a depth variance value which corresponds to the candidate use angle based on the peak 504.

A threshold value 1200 is a threshold value for identifying a use angle from among the candidate use angles according to the depth variance values, and is set to any value. Here, in FIG. 13, the depth variance value 1201 is lower than the threshold value 1200, and the candidate use angle based on the peak 501 is therefore identified as the use angle. Thus, the use angle to be used for the derivation of an angle of inclination is identified. For example, the threshold value 1200 may be the lowest depth variance value. The use angle identification processing unit 205 may identify, as the use angle, a candidate use angle which corresponds to the lowest depth variance value.

The above-described procedure is, as in the case of Embodiment 1, based on the fact that the depth values (depths) of an edge to be used for the derivation of an angle of inclination are substantially the same. Conversely, the depth values of an edge not to be used for the derivation of an angle of inclination are not the same because the edge appears along the depth direction.

In other words, the edge not to be used for the derivation of an angle of inclination includes various depth values as shown in the depth map 310 of FIG. 8, with the result that the depth variance value corresponding to the edge is high. Using this feature, the use angle identification processing unit 205 is capable of identifying, as the use angle, not the edge angle not to be used for the derivation of an angle of inclination, but the edge angle to be used for the derivation of an angle of inclination.

The inclination angle derivation unit 105 then derives an angle of inclination from the identified one or more use angles (S206). This process is the same or alike as that in Embodiment 1 and a description thereof is therefore omitted.

As above, using a condition that the depth variance value is lower than or equal to the threshold value, the image processing apparatus 200 according to this embodiment identifies the edge angle to be used for the derivation of an angle of inclination. Therefore, even when the image includes a large number of line segments, in the depth direction, such as perspective lines, the image processing apparatus 200 is capable of properly identifying the edge angle to be used for the derivation of an angle of inclination. Thus, the image processing apparatus 200 is capable of properly deriving an angle of inclination of the image.

Specifically, the image processing apparatus 200 identifies a plurality of candidate use angles, calculates depth variance values for the respective candidate use angles, and identifies a use angle according to the depth variance values. The possibility of deriving an erroneous angle of inclination decreases by using, for the derivation of an angle of inclination, the use angle identified according to the depth variance values.

It is to be noted that in the above description, the candidate use angle identification processing unit 204 identifies, as the candidate use angle, only an edge angle which corresponds to the peak that is the local maximum value in the histogram. However, the candidate use angle identification processing unit 204 may identify, as the candidate use angles, all the edge angles which each have a frequency higher than the threshold value 1100.

Furthermore, the candidate use angle identification processing unit 204 may be absent. In this case, the use angle identification processing unit 205 may calculate a depth variance value of each of all the edge angles and identify a use angle based on the proportion of the number of pixels and the depth variance value which correspond to each of all the edge angles.

The variation described in Embodiment 1 is applicable to the image processing apparatus 200 according to Embodiment 2 as well.

(Embodiment 3)

In this embodiment, the characteristic structures described in Embodiment 1 and Embodiment 2 are described for confirmation.

Figure 14:
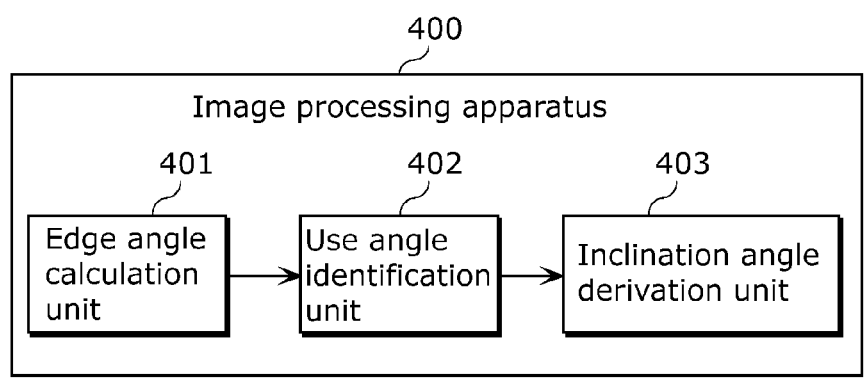
FIG. 14 is a diagram showing a structure of an image processing apparatus according to Embodiment 3.

FIG. 14 shows a structure of an image processing apparatus according to this embodiment. An image processing apparatus 400 shown in FIG. 14 derives an angle of inclination of an image. The image processing apparatus 400 includes an edge angle calculation unit 401, a use angle identification unit 402, and an inclination angle derivation unit 403.

Figure 15:
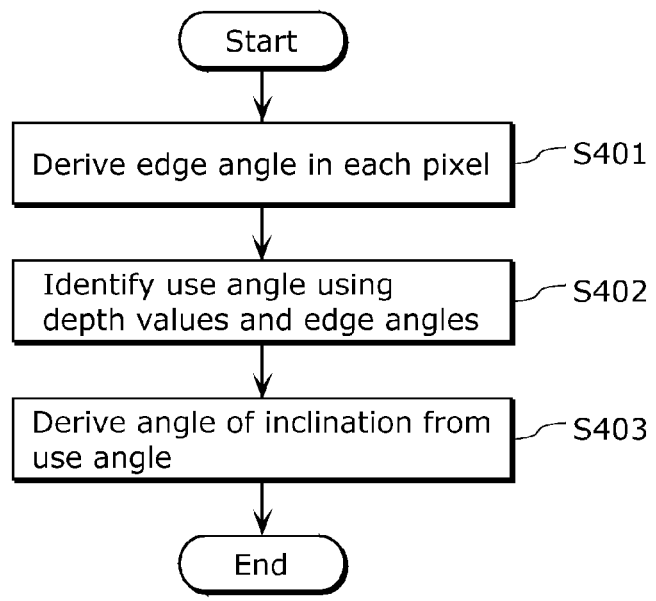
FIG. 15 is a flowchart showing an operation of the image processing apparatus according to Embodiment 3.

FIG. 15 is a flowchart showing an operation of the image processing apparatus 400 shown in FIG. 14. Firstly, the edge angle calculation unit 401 calculates a plurality of edge angles corresponding to a plurality of pixels by calculating, in each pixel in an image, an edge angle that is an angle of an edge (S401).

Next, the use angle identification unit 402 identifies one or more use angles using a plurality of depth values and the edge angles (S402). The depth value is a value which corresponds to each pixel and indicates the depth of the pixel. The use angle is an edge angle and is a candidate for the angle of inclination. Next, the inclination angle derivation unit 403 derives an angle of inclination from one or more use angles (S403).

For example, the use angle identification unit 402 may identify, as the one or more use angles, one or more edge angles each having a frequency higher than or equal to a predetermined frequency from among the edge angles which correspond to a plurality of the pixels and have a degree of depth variance lower than or equal to a predetermined degree of depth variance. As more specific structure and procedure, the structure and procedure according to Embodiment 1 or 2 may be applied.

Here, the degree of depth variance is a degree of variance of the plural depth values. The degree of depth variance may be a variance value of the plural depth values or may alternatively be a difference between the highest and lowest values of the plural depth values. For example, in the case where the variance value of the plural depth values is lower than or equal to a predetermined threshold value, the degree of depth variance may be determined to be lower than or equal to a predetermined degree of depth variance. Furthermore, in the case where plural depth values correspond to one depth level, the degree of depth variance of the plural depth values may be determined to be lower than or equal to a predetermined degree of depth variance.

The predetermined frequency may be determined based on a measurement result of the frequencies. For example, the predetermined frequency may be the highest frequency or may alternatively be a local maximum frequency.

As above, the image processing apparatus 400 according to this embodiment uses the edge angles and the depth values to derive an angle of inclination. Consequently, a proper angle of inclination based on the edge angles and the depth values is derived.

It is to be noted that a structure according to the present invention may be implemented as an apparatus and may also be implemented as a method which includes, as steps, processing units included in the apparatus. Furthermore, a structure according to the present invention may be implemented as a program which causes a computer to execute these steps and may also be implemented as a non-transitory computer-readable recording medium, such as CD-ROM, on which the program is recorded.

Furthermore, a structure according to the present invention may be implemented as information, data, or signals indicating the program. These program, information, data, and signals may be distributed via a communication network such as the Internet.

Furthermore, the image processing apparatus 100 according to Embodiment 1 may be a part of an imaging apparatus. The same applies to the image processing apparatus 110 according to Variation of Embodiment 1, the image processing apparatus 200 according to Embodiment 2, and the image processing apparatus 400 according to Embodiment 3. Specifically, the imaging apparatus may be a camera, which includes a video camera, and a still camera. For example, the imaging apparatus includes an imaging unit which captures a subject to generate an image. It may then be that the image processing apparatus 100 or the like included in the imaging apparatus derives an angle of inclination of the generated image.

(Other Variations)

A structure according to the present invention is not limited to the above embodiments. A structure according to the present invention may take the form stated below.

(1) Each of the above image processing apparatuses is specifically a computer system which includes a microprocessor, a read only memory (ROM), a random access memory (RAM), a hard disk unit, a display unit, a keyboard, a mouse, and so on.

In the RAM or the hard disk unit, a computer program is stored. When the microprocessor operates according to the computer program, the image processing apparatus achieves its functions. Here, the computer program is composed of command codes each indicating an instruction which is given to a computer in order to achieve a predetermined function.

(2) Part or all of the structural elements included in the above image processing apparatus may be provided as one system LSI (large scale integration). The system LSI is a super multifunctional LSI manufactured by integrating plural components into one chip and is specifically a computer system which includes a microprocessor, a ROM, a RAM, and so on.

In the RAM, a computer program is stored. When the microprocessor operates according to the computer program, the system LSI achieves its functions.

(3) Part or all of the structural elements included in the above image processing apparatus may be provided as an IC card or a stand alone module that can be attached to and detached from the image processing apparatus. The IC card or the module is a computer system which includes a microprocessor, a ROM, a RAM, and so on.

The IC card or the module may include the above super multifunctional LSI. When the microprocessor operates according to a computer program, the IC card or the module achieves its functions. This IC card or this module may be anti-tamper.

(4) A structure according to the present invention may be the method described above. Furthermore, a structure according to the present invention may be a computer program which implements the method using a computer, or digital signals including the computer program.

Furthermore, a structure according to the present invention may be a computer-readable recording medium, such as a flexible disk, a hard disk, a CD-ROM, a magneto-optical drive (MO), a digital versatile disc (DVD), a DVD-read only memory (DVD-ROM), a DVD-random access memory (DVD-RAM), a Blu-ray Disc (BD), or a semiconductor memory, on which the computer program or the digital signals are recorded. Furthermore, a structure according to the present invention may be the digital signals recorded on these recording media.

Furthermore, a structure according to the present invention may be a structure which transmits the computer program or the digital signals via telecommunication lines, wireless or wired communication lines, networks represented by the Internet, data broadcasting, or the like.

Furthermore, a structure according to the present invention may be a computer system which includes a microprocessor and a memory. It may then be that the above computer program is stored in the memory and that the microprocessor operates according to the computer program.

Furthermore, the program or the digital signals may be recorded on the recording medium and thus transferred, or may alternatively transferred via the network or the like. A structure according to the present invention may then be implemented by another independent computer system.

(5) The above embodiments and the above variations may be combined.

It is to be noted that in each of the above embodiments, each structural element may be constituted by dedicated hardware or achieved by executing a software program suited to the structural element. Each structural element may be achieved by a program execution unit such as a CPU or a processor executing a software program recorded on a recording medium such as a hard disk or a semiconductor memory. Here, the software which achieves the image processing apparatus according to each of the above embodiments is the following program.

Specifically, this program causes a computer to execute an image processing method for deriving an angle of inclination of an image, the image processing method comprising: calculating a plurality of edge angles corresponding to a plurality of pixels in the image by calculating, in each of the pixels, an edge angle that is an angle of an edge; identifying one or more use angles using a plurality of depth values and the edge angles, the one or more use angles each being the edge angle and each being a candidate for the angle of inclination, the depth values corresponding to the pixels and each indicating a depth of a corresponding one of the pixels; and deriving the angle of inclination from the one or more use angles.

The structural elements may be circuits. These circuits may form a single circuit as a whole or may alternatively form separate circuits. In addition, these circuits may each be a general-purpose circuit or may alternatively be a dedicated circuit.

Although the image processing apparatus according to one or more aspects of the present invention has been described above based on the embodiments, the present invention is not limited to these embodiments. Various modifications to the present embodiments that can be conceived by those skilled in the art, and forms configured by combining structural elements in different embodiments without departing from the teachings of the present invention may be included in the scope of one or more of the aspects of the present invention.

For example, in each of the above embodiments, the process which is executed by a particular processing unit may be executed by another processing unit. Furthermore, the order of plural processes may be changed, and the plural processes may be executed in parallel.

The present invention is useful to correct inclination of images and is applicable to cameras, scanners, copiers, facsimile machines, printers, television receivers, mobile phones, projectors, and so on.

[Reference Signs List]
100, 110, 200, 400 Image processing apparatus
101 Edge detection unit
102, 401 Edge angle calculation unit
103, 203 Histogram generation unit
104, 205 Use angle identification processing unit
105, 403 Inclination angle derivation unit
106 Inclination correction unit
109, 209, 402 Use angle identification unit
204 Candidate use angle identification processing unit
300, 1310 Image
301, 302, 303, 304 Edge
310 Depth map
501, 502, 503, 504, 601, 602, 603, 604 Peak
510, 610, 1100, 1200 Threshold value
1201, 1202, 1203, 1204 Depth variance value
1300 Line segment

The invention claimed is:

1. An image processing apparatus which derives an angle of inclination of an image, the image processing apparatus comprising:
a non-transitory memory device storing a program; and
a hardware processor that executes the program and causes the image processing apparatus to operate as:
an edge angle calculation unit configured to calculate a plurality of edge angles corresponding to a plurality of pixels in the image by calculating, in each of the pixels, an edge angle that is an angle of an edge;
a use angle identification unit configured to identify one or more use angles using a plurality of depth values and the edge angles, the one or more use angles each being the edge angle and each being a candidate for the angle of inclination, the depth values corresponding to the pixels and each indicating a depth of a corresponding one of the pixels, the use angle identification unit including:
a histogram generation unit configured to generate a plurality of histograms by generating, for each depth level, a histogram of the edge angles calculated by the edge angle calculation unit, the depth level indicating a degree of the depth values; and
a use angle identification processing unit configured to identify, as the one or more use angles, one or more of the edge angles which meets a predetermined condition in the histograms; and
an inclination angle derivation unit configured to derive the angle of inclination from the one or more use angles.

2. The image processing apparatus according to claim 1, wherein the use angle identification unit is configured to identify, as the one or more use angles, one or more edge angles each having a frequency higher than or equal to a predetermined frequency from among the edge angles which correspond to a plurality of the pixels and have a degree of depth variance lower than or equal to a predetermined degree of depth variance, the degree of depth variance indicating a degree of variance of the depth values.

3. The image processing apparatus according to claim 1, wherein the use angle identification processing unit is configured to identify, as the one or more use angles, one or more of the edge angles which has a frequency higher than or equal to a predetermined frequency in any of the histograms.

4. The image processing apparatus according to claim 1, wherein the use angle identification processing unit is configured to identify, as the one or more use angles, one or more of the edge angles which has a highest frequency in the histograms.

5. The image processing apparatus according to claim 1, wherein the use angle identification processing unit is configured to identify, as the one or more use angles, one or more of the edge angles which has a local maximum frequency in any of the histograms.

6. The image processing apparatus according to claim 1, wherein the use angle identification unit includes:
a candidate use angle identification processing unit configured to identify a plurality of candidate use angles that are a plurality of the edge angles which meet a predetermined condition in the histogram, the candidate use angles being a plurality of candidates for the one or more use angles, and
the use angle identification processing unit obtains a plurality of degrees of depth variance corresponding to the candidate use angles by obtaining a degree of depth variance for each of the candidate use angles, and identifies the one or more use angles from among the candidate use angles based on the degrees of depth variance, the degree of depth variance indicating a degree of variance of the depth values.

7. The image processing apparatus according to claim 6, wherein the use angle identification processing unit is configured to identify, as the one or more use angles, at least one of the candidate use angles that corresponds to the degree of depth variance which is lower than or equal to a predetermined degree of depth variance.

8. The image processing apparatus according to claim 6, wherein the candidate use angle identification processing unit is configured to identify, as the candidate use angles, a plurality of the edge angles each having a frequency higher than or equal to a predetermined frequency in the histogram.

9. The image processing apparatus according to claim 1, further comprising
an inclination correction unit configured to correct inclination of the image using the angle of inclination derived by the inclination angle derivation unit.

10. The image processing apparatus according to claim 1, wherein the inclination angle derivation unit is configured to derive, as the angle of inclination, (i) a mean value of the one or more use angles or (ii) any of the one or more use angles.

11. An image processing method for an image processing apparatus for deriving an angle of inclination of an image, the image processing apparatus includes a non-transitory memory device storing a program, and a hardware processor that executes the program and causes the image processing apparatus to perform the image processing method comprising:
calculating a plurality of edge angles corresponding to a plurality of pixels in the image by calculating, in each of the pixels, an edge angle that is an angle of an edge;
identifying one or more use angles using a plurality of depth values and the edge angles, the one or more use angles each being the edge angle and each being a candidate for the angle of inclination, the depth values corresponding to the pixels and each indicating a depth of a corresponding one of the pixels, the identifying of the one or more use angles includes:
generating a plurality of histograms by generating, for each depth level, a histogram of the edge angles calculated by the edge angle calculation unit, the depth level indicating a degree of the depth values; and
identifying, as the one or more use angles, one or more of the edge angles which meets a predetermined condition in the histograms; and
deriving the angle of inclination from the one or more use angles.

12. A non-transitory computer-readable recording medium having recorded thereon a program for causing a computer to execute the image processing method according to claim 11.

13. An integrated circuit which derives an angle of inclination of an image, the integrated circuit comprising:
a non-transitory memory device storing a program; and
a hardware processor that executes the program and causes the integrated circuit to operate as:
an edge angle calculation unit configured to calculate a plurality of edge angles corresponding to a plurality of pixels in the image by calculating, in each of the pixels, an edge angle that is an angle of an edge;
a use angle identification unit configured to identify one or more use angles using a plurality of depth values and the edge angles, the one or more use angles each being the edge angle and each being a candidate for the angle of inclination, the depth values corresponding to the pixels and each indicating a depth of a corresponding one of the pixels, the use angle identification unit including:
a histogram generation unit configured to generate a plurality of histograms by generating, for each depth level, a histogram of the edge angles calculated by the edge angle calculation unit, the depth level indicating a degree of the depth values; and
a use angle identification processing unit configured to identify, as the one or more use angles, one or more of the edge angles which meets a predetermined condition in the histograms; and
an inclination angle derivation unit configured to derive the angle of inclination from the one or more use angles.

* * * * *